US009077561B2

(12) United States Patent
Kotrabasappa et al.

(10) Patent No.: US 9,077,561 B2
(45) Date of Patent: Jul. 7, 2015

(54) OAM LABEL SWITCHED PATH FOR FAST REROUTE OF PROTECTED LABEL SWITCHED PATHS

(75) Inventors: Santosh Pallagatti Kotrabasappa, Bangalore (IN); Vikas Hegde, Bangalore (IN); Prashant Singh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 504 days.

(21) Appl. No.: 13/431,717

(22) Filed: Mar. 27, 2012

(65) Prior Publication Data

US 2013/0259056 A1    Oct. 3, 2013

(51) Int. Cl.
| | |
|---|---|
| H04L 12/28 | (2006.01) |
| H04L 12/46 | (2006.01) |
| H04L 12/707 | (2013.01) |
| H04L 12/703 | (2013.01) |
| H04L 12/723 | (2013.01) |

(52) U.S. Cl.
CPC ............ *H04L 12/4633* (2013.01); *H04L 45/24* (2013.01); *H04L 45/28* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 8,077,726 B1 | 12/2011 | Kumar et al. | |
| 2004/0114595 A1* | 6/2004 | Doukai | 370/389 |
| 2009/0232003 A1* | 9/2009 | Vasseur et al. | 370/236.2 |
| 2011/0182189 A1* | 7/2011 | Martini et al. | 370/248 |
| 2011/0280121 A1* | 11/2011 | Boutros et al. | 370/221 |
| 2012/0033671 A1* | 2/2012 | Tanaka | 370/392 |
| 2013/0021918 A1* | 1/2013 | Fiorone et al. | 370/242 |
| 2014/0029416 A1* | 1/2014 | Ceccarellli et al. | 370/225 |

FOREIGN PATENT DOCUMENTS

WO    2011045733 A1    4/2011

OTHER PUBLICATIONS

Search Report from Counterpart European Patent Application No. 12196810.1, dated Nov. 10, 2014, 7 pp.
Pan et al., "Fast Reroute Extensions to RSVP-TE for LSP Tunnels," Network Working Group, RFC 4090, May 2005, 39 pp.
Nadeau et al., "Operations and Management (OAM) Requirements for Multi-Protocol Label Switched (MPLS) Networks," Network Working Group, RFC 4377, Feb. 2006, 16 pp.

(Continued)

*Primary Examiner* — Ian N Moore
*Assistant Examiner* — Phong La
(74) *Attorney, Agent, or Firm* — Shumaker & Sieffert, P.A.

(57) ABSTRACT

In response to receiving a reply message for reserving bandwidth along a primary path for a first label switched path (LSP) for carrying data traffic from an ingress network device to an egress network device, a point of local repair (PLR) network device establishes a second LSP from the PLR to a merge point (MP) network device along a subset of the primary path. The second LSP is dedicated to carrying operations, administration and management (OAM) messages to verify connectivity of the subset of the primary path, and is not used for sending data traffic. The PLR sends an OAM message to verify connectivity of at least one protected resource along the subset of the primary path to a next hop along the second LSP, wherein the OAM message is encapsulated by a second label associated with the second LSP.

21 Claims, 4 Drawing Sheets

(56) References Cited

OTHER PUBLICATIONS

Kompella et al., "Detecting Multi-Protocol Label Switch (MPLS) Data Plane Failures," Network Working Group, RFC 4379, Feb. 2006, 51 pp.

Aggarwal et al., "Bidirectional Forwarding Detection (BFD) for MPLS Label Switch Paths (LSPs)," Network Working Group, RFC 5884, Jun. 2010, 13pp.

Bahadur et al., "Mechanism for Performing Label Switch Path Ping (LSP Ping) Over MPLS Tunnels," Network Working Group, RFC 6424, Nov. 2011, 24 pp.

Gray et al., "MPLS On-Demand Connectivity Verification and Route Tracing," Network Working Group, RFC 6426, Nov. 2011, 22 pp.

Swallow et al., "MPLS Fault Management Operations, Administration, and Maintenance (OAM)," IETF, RFC 6427, Nov. 2011, 17 pp.

Allan et al., "Proactive Connectivity Verification, Continuity Check, and Remote Defect Indication for the MPLS Transport Profile," IETF, RFC 6428, Nov. 2011, 22 pp.

Boutros et al., "MPLS Transport Profile Lock Instruct and Loopback Functions," IETF, RFC 6435, Nov. 2011, 13 pp.

* cited by examiner

OAM LABEL SWITCHED PATH FOR FAST REROUTE OF PROTECTED LABEL SWITCHED PATHS

TECHNICAL FIELD

The disclosure relates to packet-based computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as the Border Gateway Protocol (BGP).

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS). A packet may be a formatted set of data.

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System—Intermediate System (ISIS) protocol or the Open Shortest Path First (OSPF) protocol.

Head-end routers of an LSP are commonly known as ingress routers, while routers at the tail-end of the LSP are commonly known as egress routers. Ingress and egress routers, as well as intermediate routers along the LSP that support MPLS, are referred to generically as label switching routers (LSRs). A set of packets to be forwarded along the LSP is referred to as a forwarding equivalence class (FEC). A plurality of FECs may exist for each LSP, but there may be only one active LSP for any given FEC. Typically, a FEC definition includes the IP address of the destination of the LSP, e.g., an IP address assigned to the egress router of the LSP. The ingress label edge router (LER) uses routing information, propagated from the egress LER, to determine the LSP, to assign labels for the LSP, and to affix a label to each packet of the FEC. The LSRs use MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR or LER. The egress LER removes the label from the packet and forwards the packet to its destination in accordance with non-label based packet forwarding techniques.

In general, each router along the LSP maintains a context that associates a FEC with an incoming label and an outgoing label. In this manner, when an LSR receives a labeled packet, the LSR may swap the label (i.e., the incoming label) with the outgoing label by performing a lookup in the context. The LSR may then forward the packet to the next LSR or LER along the LSP. The next router along the LSP is commonly referred to as a downstream router or a next hop.

In some instances, a node or link along an LSP may no longer be available. For example, a link along the LSP, or a node may experience a failure event, such as when one or more components of a router fail or the router is brought down by a user, such as a network operator. In these instances, signaling of a new LSP would fail when the LSP was to be explicitly routed along a path that traverses the unavailable link or node. An LSR along the path of the new LSP would detect the failed link or node, and may send an error message indicating that the new LSP cannot be established as requested.

The connection between two devices on a network is generally referred to as a link. Connections between devices of different autonomous systems are referred to as external links while connections between devices within the same autonomous system are referred to as internal links. Many conventional computer networks, including the Internet, are designed to dynamically reroute data packets in the event an individual link fails. Upon failure of a link, the routers transmit new connectivity information to neighboring devices, allowing each device to update its local routing table. Links can fail for any number of reasons, such as failure of the physical infrastructure between the devices, or failure of the devices interfacing with the link.

When a link or router in the network fails, routers using traditional link state protocols, such as OSPF and/or IS-IS, may take a long time to adapt their forwarding tables in response to the topological change resulting from node and/or link failures in the network. The process of adapting the forwarding tables is known as convergence. This time delay occurs because each node must update its representation of the network topology and execute the shortest path algorithm to calculate the next-hop for each destination within the updated network topology. Until the next-hops are re-computed, traffic being sent toward the failed links may be dropped. Some deployments take as much as 500 milliseconds to several seconds for detection and recovery from failures in the network. These large convergence times may adversely affect the performance of applications such as Voice over Internet Protocol (VoIP) and multimedia applications, which often rely on RSVP-TE, and are extremely sensitive to traffic loss. A resource reservation protocol, such as RSVP-TE, may be used to traffic-engineer paths through a network for sending network traffic associated with these types of traffic-loss-sensitive applications.

SUMMARY

In general, this disclosure describes techniques for promptly triggering re-reroute of network data traffic from a primary label-switched path (LSP) carrying data traffic over a primary path between an ingress network device and an egress network device to a backup path in the event of a failure of a resource along the primary path. For example, the techniques employ an LSP dedicated to operations, administration and management (OAM) communications exchanged between a point of local repair (PLR) network device and a merge point (MP) network device along the primary path, to monitor and detect liveliness of the primary path between the PLR and MP. The dedicated OAM LSP carries OAM communications, is distinct from the primary LSP, and carries no data traffic.

Upon detecting that a primary LSP is established, the PLR can dynamically create a dedicated OAM LSP between the PLR and MP to monitor the path between the PLR and MP. The PLR can create the dedicated OAM LSP when the PLR provides node or link protection to a primary LSP. A protocol for signaling LSPs, such as Resource Reservation Protocol with Traffic Engineering extensions (RSVP-TE), can be extended as described herein to allow for dynamic signaling of the OAM LSP associated with one or more primary LSPs to assist in fast reroute of data traffic in the case of a failure along the primary path. For example, the PLR can examine a Record Route Object (RRO) contained within an RSVP-TE RESV message received during setup of each data LSP that the PLR is protecting. Based on the RRO, the PLR can identify the primary path from the PLR to MP and automatically establish a new OAM LSP along the primary path that will monitor the primary path, or map a new data LSP to an existing OAM LSP along the primary path. The PLR can maintain a mapping of the protected data LSPs to the OAM LSP. When the OAM LSP reports that the liveliness is down along the primary path between the PLR and MP due to a link or node failure along the primary path, the data plane of the PLR can quickly and automatically reroute all of the data LSPs linked to the OAM LSP to the appropriate protecting LSP(s).

In some examples, a network administrator may statically configure an OAM LSP as a dedicated OAM LSP, rather than the network device automatically and dynamically establishing OAM LSP upon receiving a RESV message for a protected data LSP. A static OAM LSP may be used, for example, when loop-free alternates (LFA) are used for fast reroute. As another example, an administrator may configure a static OAM LSP when the RSVP-TE executing on a network device is not enabled with the functionality described herein for dynamically creating an OAM LSP. The techniques of this disclosure may provide one or more advantages. For example, the techniques described herein may allow for rerouting of data traffic onto a backup protecting LSP in potentially less than 50 milliseconds from the time of failure. The techniques allow a PLR to monitor and detect liveliness of an active path between the PLR and MP, rather than monitoring only the operational status of the MP. The techniques describe herein can therefore result in detection of failures in scenarios in which failure would not otherwise be noticed by the PLR. By reducing failure recovery time to potentially less than 50 ms, the techniques may better accommodate Voice over Internet Protocol (VoIP), multimedia, and other applications sensitive to packet loss, in comparison to conventional deployments.

In one example aspect, a method includes in response to receiving a reply message with a first network device for reserving bandwidth along a primary path for a first LSP for carrying data traffic from an ingress network device to an egress network device, establishing a second LSP from the first network device to a second network device along a subset of the primary path, wherein the first network device comprises a point of local repair along the primary path and the second network device comprises a merge point for merging rerouted data traffic from a protecting LSP back onto the first LSP along the primary path, wherein the second LSP is dedicated to carrying OAM messages to verify connectivity of the subset of the primary path. The method also includes forwarding data traffic received at the first network device to a next hop along the primary path, wherein the forwarded data traffic is encapsulated with a first label associated with the first LSP, and outputting, with the first network device, an OAM message to a next hop along the second LSP to verify connectivity of at least one protected resource along the subset of the primary path, wherein the OAM message is encapsulated with a second label associated with the second LSP.

In another example aspect, a network device includes a hardware-based processor, a Resource Reservation Protocol with Traffic Engineering extensions (RSVP-TE) module executing on the hardware-based processor, wherein, in response to receiving a reply message with a first network device for reserving bandwidth along a primary path for a first label switched path (LSP) for carrying data traffic from an ingress network device to an egress network device, the RSVP-TE module is configured to establish a second LSP from the first network device to a second network device along a subset of the primary path, wherein the first network device comprises a point of local repair along the primary path and the second network device comprises a merge point for merging rerouted data traffic from a protecting LSP back onto the first LSP along the primary path, wherein the second LSP is dedicated to carrying operations, administration and management (OAM) messages to verify connectivity of the subset of the primary path. A forwarding component configured to forward data traffic received at the first network device to a next hop along the primary path, wherein the forwarded data traffic is encapsulated with a first label associated with the first LSP, and an OAM module configured to generate an OAM message, wherein the forwarding component is configured to output the OAM message to a next hop along the second LSP to verify connectivity of at least one protected resource along the subset of the primary path, wherein the forwarding component encapsulates the OAM message with a second label associated with the second LSP.

In a further example aspect, a computer-readable storage medium includes instructions for causing a programmable processor to, in response to receiving a reply message with a first network device for reserving bandwidth along a primary path for a first LSP for carrying data traffic from an ingress network device to an egress network device, establish a second LSP from the first network device to a second network device along a subset of the primary path, wherein the first network device comprises a point of local repair along the primary path and the second network device comprises a merge point for merging rerouted data traffic from a protecting LSP back onto the first LSP along the primary path, wherein the second LSP is dedicated to carrying OAM messages to verify connectivity of the subset of the primary path. The instructions further include instructions to forward data traffic received at the first network device to a next hop along the primary path, wherein the forwarded data traffic is encapsulated with a first label associated with the first LSP, and output an OAM message to a next hop along the second LSP to verify connectivity of at least one protected resource along the subset of the primary path, wherein the OAM message is encapsulated by a second label associated with the second LSP.

The details of one or more examples are set forth in the accompanying drawings and the description below. Other features, objects, and advantages will be apparent from the description and drawings, and from the claims.

DETAILED DESCRIPTION

Figure 1:
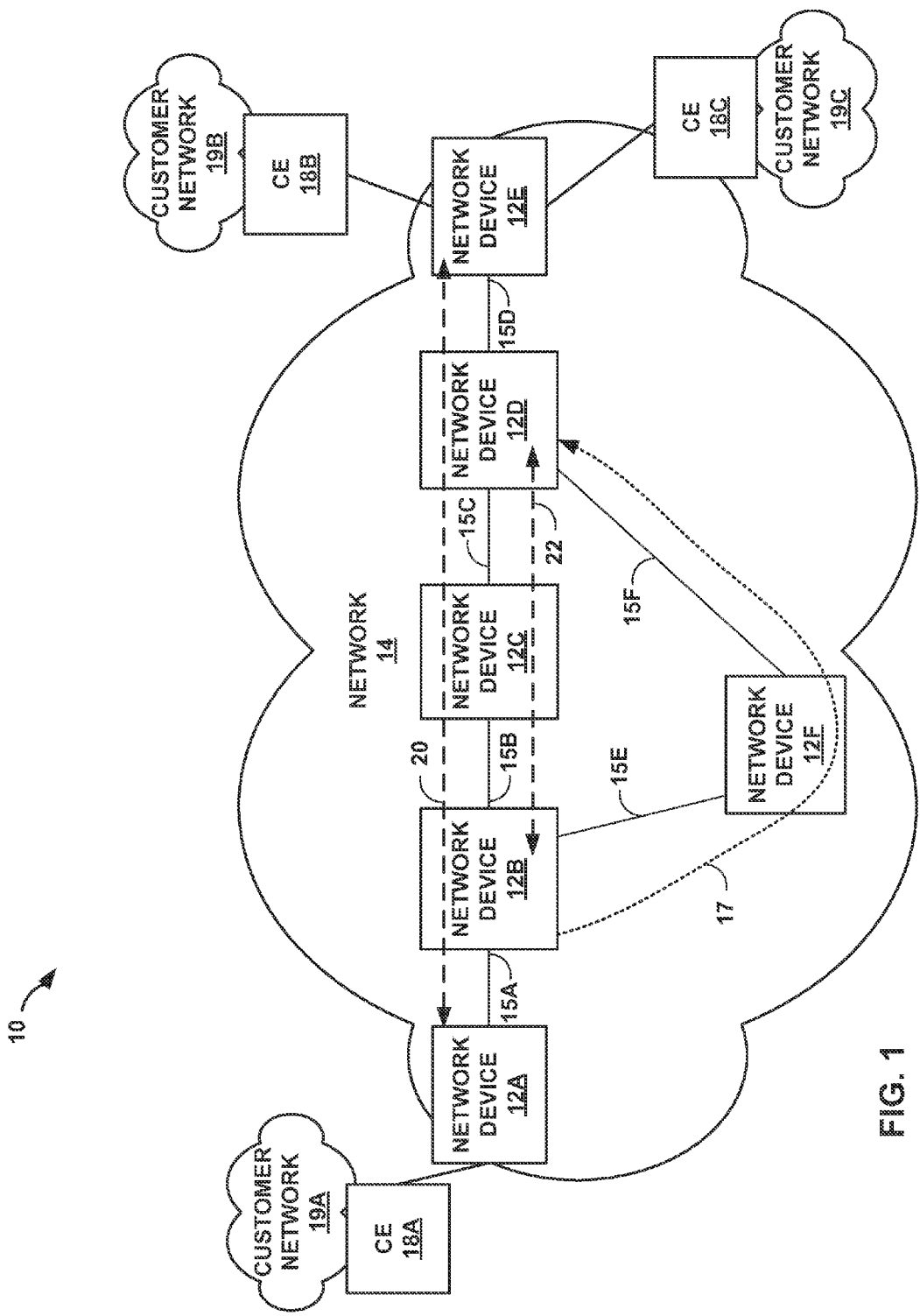
FIG. 1 is a block diagram illustrating an example system in which routers are configured to forward network traffic in accordance with the techniques of this disclosure.

FIG. 1 is a block diagram illustrating an example system 10 in which network devices 12A-12F ("network devices 12") of network 14 are configured to forward network traffic (e.g., network packets) in accordance with the techniques of this disclosure. In the illustrated example of FIG. 1, network devices 12A and 12E are edge devices of a network 14. In some examples, network 14 may be administered by a network service provider, and provides connectivity for customer networks 19A-19C ("customer networks 19"). Edge network devices 12A and 12E are coupled to customer edge (CE) network devices 18A-18C ("CE network devices 18") of customer networks 19 via access links. Edge network devices 12A and 12E communicate with CE network devices 18 to provide customer networks 19 with access to network 14. Network devices 12 and CE network device 18 may be routers, devices that incorporate routing functionality, or other types of network devices.

Each of customer networks 19 may be a network for a site of an enterprise. Each of customer networks 19 may include one or more computing devices (not shown), such as personal computers, laptop computers, handheld computers, workstations, servers, switches, printers, or other devices. Network 14 may be a service provider network coupled to one or more networks administered by other service providers, and may thus form part of a large-scale public network infrastructure, e.g., the Internet. Customer networks 19 may represent edge networks of the Internet. The service provider may provide computing devices within customer networks 19 with access to the Internet via network 14, which allows computing devices within one of customer networks 19 to communicate with computing devices within the Internet or the other one of customer networks 19. FIG. 1 may be a simplified view of network 14. Network 14 may include a variety of other network devices (not shown), such as routers, switches, servers, and the like, and may be connected to other networks.

In this example, network devices 12A-12F are connected to one another by physical links 15A-15F ("links 15") coupled to network devices 12A-12F, such as by interface ports (not shown). The physical links 15 may be of a physical medium, such as a copper wire, a coaxial cable, any of a host of different fiber optic lines, or a wireless connection. In addition, network devices may define "virtual" or "logical" links, and map the virtual links to the physical links. Network devices 12 may also include interface ports 16 (not shown), which each may be associated with a different identifier, such as an Internet Protocol (IP) address.

In order to maintain an accurate representation of the network 14, network devices 12 exchange routing information using control-plane signaling in accordance with one or more defined protocols, such as the Border Gateway Protocol (BGP). When routers of different autonomous systems use BGP to exchange information, the protocol is referred to as External BGP (EBGP). When routers within an autonomous system use BGP to exchange routing information, the protocol is referred to as Internal BGP (IBGP). Another example protocol for exchanging routing information is the Intermediate System to Intermediate System protocol (ISIS), which is an interior gateway routing protocol for IP networks for communicating link-state information within an autonomous system. Other examples of interior routing protocols include the Open Shortest Path First (OSPF), and the Routing Information Protocol (RIP).

When two of network devices 12 initially connect, the routers typically exchange their routing information. The network devices 12 send control messages to incrementally update the routing information when the network topology changes. For example, network devices 12 may send update routing protocol messages to advertise newly available routes and to withdraw routes that are no longer available. Network devices 12 may maintain the routing information in the form of one or more routing tables or other data structures. The form and contents of the routing tables depends on the routing algorithm implemented by the network devices 12. Furthermore, as described in further detail below, network devices 12 generate and maintain forwarding information in accordance with the routing information. The forwarding information associates network routes with specific forwarding next hops and corresponding interface ports of the network device 12. The forwarding information may, therefore, be thought of as a subset of the information contained within routing information. The process of generating the forwarding information is generally referred to as route resolution.

In the example of FIG. 1, network devices 12 may establish a primary label switched path (LSP) 20 between ingress network device 12A and egress network device 12E, along the path from network device 12A, to network device 12B, to network device 12C, to network device 12D, to network device 12E. For example, network device 12A may operate as an ingress router to initiate establishment of an explicitly-routed LSP 20, e.g., using the Resource Reservation Protocol with Traffic-Engineering extensions (RSVP-TE). As one example, network device 12A may establish the LSP 20 to carry layer two (L2) communications from customer network 19A to customer networks 19B, 19C in the form of MPLS packets that enter LSP 20 at ingress network device 12A and exit the LSPs at egress network device 12E.

In one example, to initiate setup of LSP 20, network device 12A may generate an RSVP-TE PATH message that specifies a path for the desired explicitly-routed LSP 20 in an Explicit Route Object (ERO) of the PATH message. The PATH message is a resource request message that requests resources to be reserved on the specified path. In this example, network device 12A selects an explicit route for LSP 20 along a path from network device 12A to network device 12B (over link 15A) to network device 12C (over link 15B) to network device 12D (over link 15C) to network device 12E (over link 15D), where network device 12E is to be the egress of LSP 20. The ERO of the PATH message sent by network device 12A may therefore specify [12A, 12B, 12C, 12D, 12E], or, more specifically, sub-objects consisting of IP addresses associated with interface ports of each of network devices 12. As the ingress router of LSP 20, network device 12A may also specify within the PATH message whether network device 12A desires MPLS fast reroute link protection, node protection, or both. Network device 12A sends the PATH message over link 15A to network device 12B.

After receiving a PATH message from network device 12D, egress network device 12E sends a RESV message that includes an RRO along the reverse path from network device 12E to network device 12A, where the RRO specifies [12E, 12D, 12C, 12B, 12A]. Where the PATH message specified that network device 12A desires MPLS fast reroute link protection and/or node protection, network device 12B may operate as a point of local repair (PLR) for protecting network device 12C or links 15B or 15C. When network device 12B receives the RESV message from network device 12C, network device 12B may initiate establishment of a protecting LSP 17 to provide FRR protection.

In the example of FIG. 1, network device 12B determines that network device 12B has an alternate path to network device 12D that would avoid network device 12C or links 15B or 15C, and signals MPLS fast reroute protecting LSP 17 over network devices 12B, 12F, and 12D. Network device 12D may be referred to as a merge point network device 12D in this context because network device 12D provides a merge point for LSPs 17 and 20. Protecting LSP 17 is an LSP that provides link protection for links 15B and 15C and node protection for network device 12C, such that if any of links 15B and 15C or network device 12C should fail, network device 12B can tunnel network traffic from the primary LSP 20 through protecting LSP 17. Network device 12B may establish protecting LSP 17 in accordance with MPLS fast reroute techniques, such as those described in P. Pan, Fast Reroute Extensions to RSVP-TE for LSP Tunnels, Network Working Group RFC 4090, May 2005, the entire content of which is incorporated by reference herein. In some examples, protecting LSP 17 may be a bypass tunnel that provides protection for a plurality of LSPs (providing one-to-many fast reroute protection). In other examples, protecting LSP 17 may be a backup LSP that protects only data LSP 20 (providing one-to-one fast reroute protection). In general, the term "protecting LSP" may be used herein to refer to use of an LSP in either scenario.

For example, as the point of local repair (PLR) and ingress of protecting LSP 17, network device 12B may establish protecting LSP 17 to protect primary LSP 20 as well as one or more other existing LSPs that traverse at least network device 12B and network device 12D and do not traverse links 15E and 15F. In establishing the protecting LSP 17, network device 12B may send a PATH message that includes an ERO of [12B, 12F, 12D]. Network device 12D receives a PATH message from network device 12C, and responds by sending a RESV message that includes an RRO of [12D, 12F, 12B] along the reverse path. After network device 12B finishes establishing protecting LSP 17, network device 12B maintains forwarding information in a data plane of network device 12B that allows network device 12B to send traffic through protecting LSP 17 if link 15B, link 15C, or network device 12C fails. See, for example, techniques described by U.S. Pat. No. 8,077,726, entitled "Fast Reroute for Multiple Label Switched Paths Sharing a Single Interface," issued Dec. 13, 2011, the entire contents of which are incorporated by reference herein.

In some aspects, protecting LSP 17 may exist in the absence of any existing LSP protected by protecting LSP 17. As one example, network device 12B may be configured not to tear down protecting LSP 17 for some time period after taking down the last protected LSP using protecting LSP 17, so that if another LSP is established within the time period, and this other LSP would desire protection by protecting LSP 17, it is not necessary to re-establish protecting LSP 17 anew. For at least this configured time period, protecting LSP 17 may exist without an associated protected LSP also existing at the same time.

In the absence of the extensions to RSVP-TE described herein, if a link or node between PLR network device 12B and merge point network device 12D fails, an OAM mechanism such as bidirectional forwarding detection (BFD) may be running between network device 12B and network device 12D, but may send packets over the alternate network device through network device 12F after the failure, in which case network device 12B will continue to be told that network device 12D is available without being notified of the failure along the primary path through network device 12C.

The techniques of this disclosure allow network device 12B to establish a label-switched path (LSP) dedicated to operations, administration and management (OAM) protocol communications exchanged between a point of local repair (PLR) network device and a merge point (MP) network device along the primary path, to monitor and detect liveliness of the primary path between the PLR and MP. The dedicated OAM LSP is distinct from the primary LSP and carries no data traffic, only OAM communications.

Upon detecting that primary LSP 20 is established, PLR network device 12B can dynamically create a dedicated OAM LSP 22 between PLR network device 12B and MP network device 12D to monitor the path between PLR network device 12B and MP network device 12D. The dedicated OAM LSP 22 can be created when the PLR provides node or link protection to a primary LSP. A protocol for signaling LSPs, such as Resource Reservation Protocol with Traffic Engineering extensions (RSVP-TE), can be extended as described herein to allow for dynamic signaling of the OAM LSP 22 associated with one or more primary LSPs to assist in fast reroute of data traffic in the case of a failure along the primary path. For example, the PLR network device 12B can examine a Record Route Object (RRO) contained within an RSVP-TE RESV message received for each data LSP that the PLR network device 12B is protecting. Based on the RRO, the PLR network device 12B can identify the primary path from the PLR network device 12B to MP and establish a new OAM LSP 22 along the primary path that will monitor the primary path, or map a newly established data LSP to an existing OAM LSP 22 along the primary path. The PLR network device 12B can maintain a mapping of protected data LSPs to the OAM LSP 22.

Subsequently, when a protected resource such as link 15B, link 15C, or network device 12C becomes inoperable, an OAM mechanism running over OAM LSP 22 detects the failed link and informs PLR network device 12B that primary LSP 20 is not operational. When an OAM module of PLR network device 12B reports that the liveliness of OAM LSP 22 is down due to a link or node failure along the primary path between the PLR network device 12B and MP network device 12D, the data plane of the PLR network device 12B can automatically reroute all of the data LSPs linked to the OAM LSP to the appropriate backup data LSP(s). For example, PLR 12B can then quickly reroute all data LSPs linked to the OAM LSP 20 to their respective protecting LSPs, such as protecting LSP 17. For example, PLR 12B begins forwarding data traffic from primary LSP 20 to protecting LSP 17. This can provide faster reroute of data traffic from a failed primary path to a backup path, such as in less than 50 ms of the failure occurring. This can reduce packet loss and improve a user's experience.

Example OAM mechanisms or protocols that may run on the OAM LSP 22 may include LSP ping, traceroute, bidirectional forwarding detection (BFD) for MPLS, MPLS Transport Profile (MPLS-TP) continuity check and proactive connectivity verification, MPLS-TP lock instruct and loopback function, MPLS-TP fault management, and other OAM mechanisms. A few example OAM mechanisms that may be used on OAM LSP 22 are described in the following documents, the entire contents of each of which are incorporated by reference herein: R. Aggarwal, "Bidirectional Forwarding Detection (BFD) for MPLS Label Switched Paths (LSPs)," IETF RFC 5884, June 2010; K. Kompella, "Detecting Multi-Protocol Label Switched (MPLS) Data Plane Failures," Network Working Group RFC 4379, February 2006; N. Bahadur, "Mechanism for Performing Label Switched Path Ping (LSP Ping) over MPLS Tunnels," IETF RFC 6424, November 2011; E. Gray, "MPLS On-Demand Connectivity Verification and Route Tracing," IETF RFC 6426, November 2011; G. Swallow, "MPLS Fault Management Operations, Administration, and Maintenance (OAM)," RFC 6427, November 2011; and T. Nadeau, "Operations and Management (OAM) Requirements for Multi-Protocol Label Switched (MPLS) Networks," Network Working Group RFC 4377, February 2006.

For example, in the case of MPLS-TP lock instruct and loopback function, an administrator may set a locked administrative status on OAM LSP 22 so that only test traffic, if any, and OAM traffic for OAM LSP 22 can be mapped onto OAM LSP 22. In this manner, OAM LSP 22 can be dedicated for OAM purposes and will carry no data traffic. The loopback function allows an operator to set a specific node on a transport path into loopback mode such that it returns all received data. Further details may be found in S. Boutros, "MPLS Transport Profile Lock Instruct and Loopback Functions," IETF RFC 6435, November 2011, the entire contents of which are incorporated by reference herein. OAM LSP 22 may be used to send one or more MPLS fault management messages.

In these and other examples, network device 12B may send an MPLS-TP continuity check (CC) message over OAM LSP 22, which may consist of a BFD control packet pre-pended by a Generic associated Channel label. In a further example, network device 12B may send an MPLS-TP connectivity verification (CV) message on OAM LSP 22, which may consist of a BFD control packet pre-pended by an associated channel header (ACH) and appended by a source Maintenance Entity Group End Point identifier (MEP-ID) type-length-value (TLV). Further details may be found in D. Allan, "Proactive Connectivity Verification, Continuity Check, and Remote Defect Indication for the MPLS Transport Profile," IETF RFC 6428, November 2011, the entire contents of which are incorporated by reference herein.

Although described for purposes of example in terms of a single OAM LSP 22, network 14 may include a plurality of OAM LSPs associated with different PLR-MP pairs, and associated with various protected data LSPs. In some examples, a network administrator may statically configure OAM LSP 22 as a dedicated OAM LSP, rather than network device 12B dynamically configuring OAM LSP 22 upon receiving a RESV message for a protected data LSP. A static OAM LSP may be used, for example, when loop-free alternates (LFA) are used for fast reroute. As another example, an administrator may configure a static OAM LSP when the RSVP-TE executing on a network device is not enabled with the functionality described herein for dynamically creating an OAM LSP.

For example, the techniques described herein may allow for rerouting of data traffic onto a protecting LSP in less than 50 milliseconds from the time of failure. The techniques allow a PLR to monitor and detect liveliness of an active path between the PLR and MP, rather than monitoring only the operational status of the MP. The techniques describe herein can therefore result in detection of failures in scenarios in which failure would not otherwise be noticed by the PLR.

For example, in MPLS, a PLR which is connected to MP more than one hop away may use a multi-hop Bidirectional Forwarding Detection (BFD). Multi-hop BFD does not monitor a data path, but rather monitors a neighbor. In case of equal cost multipath (ECMP) paths between the PLR and MP, BFD will stay up even if one of the links goes down. If a PLR has multiple IP path to the MP, then achieving reroute time of less than 50 milliseconds may be difficult because BFD would stay up on the alternative path even when the primary path was down. In the absence of the techniques of this disclosure, use of an Interior Gateway Protocol (IGP) BFD may fail to trigger fast reroute to would divert the traffic to backup path. To remedy this problem in these situations, the PLR can, in accordance with the techniques of this disclosure, establish an OAM LSP established over the primary one of the ECMP paths, and the PLR can use the OAM LSP to detect a failure of the ECMP link and report the failure to its data plane for fast reroute of data traffic onto a backup path that avoids a failed resource on the primary path.

The techniques of this disclosure may be useful when a PLR is directly connected to the MP, where, in the case of unnumbered links, the PLR may have two ECMP next hops to reach MP though directly connected. This may be the case even for an Ethernet link configured as P2P/P2MP links. In the absence of the techniques of this disclosure, IGP BFD may stay up on the ECMP next hop even if one of the links fails, which can make recovery in less than 50 ms difficult. The same scenario may be applicable to routing protocols and loop free alternates (LFA) which rely on BFD to detect link failure. In these situations, an OAM LSP established over the primary one of the ECMP links in accordance with the techniques of this disclosure can allow a PLR (here, network device 12B) to detect a failure of the ECMP link and report the failure to the data plane for fast reroute onto a backup path. In this manner, the PLR can detect failures in scenarios in which the failures would not otherwise be noticed by the PLR. By reducing times to recover from a failure to potentially less than 50 ms, the techniques may better accommodate Voice over Internet Protocol (VoIP), multimedia, and other applications sensitive to packet loss in comparison to conventional deployments.

Figure 2:
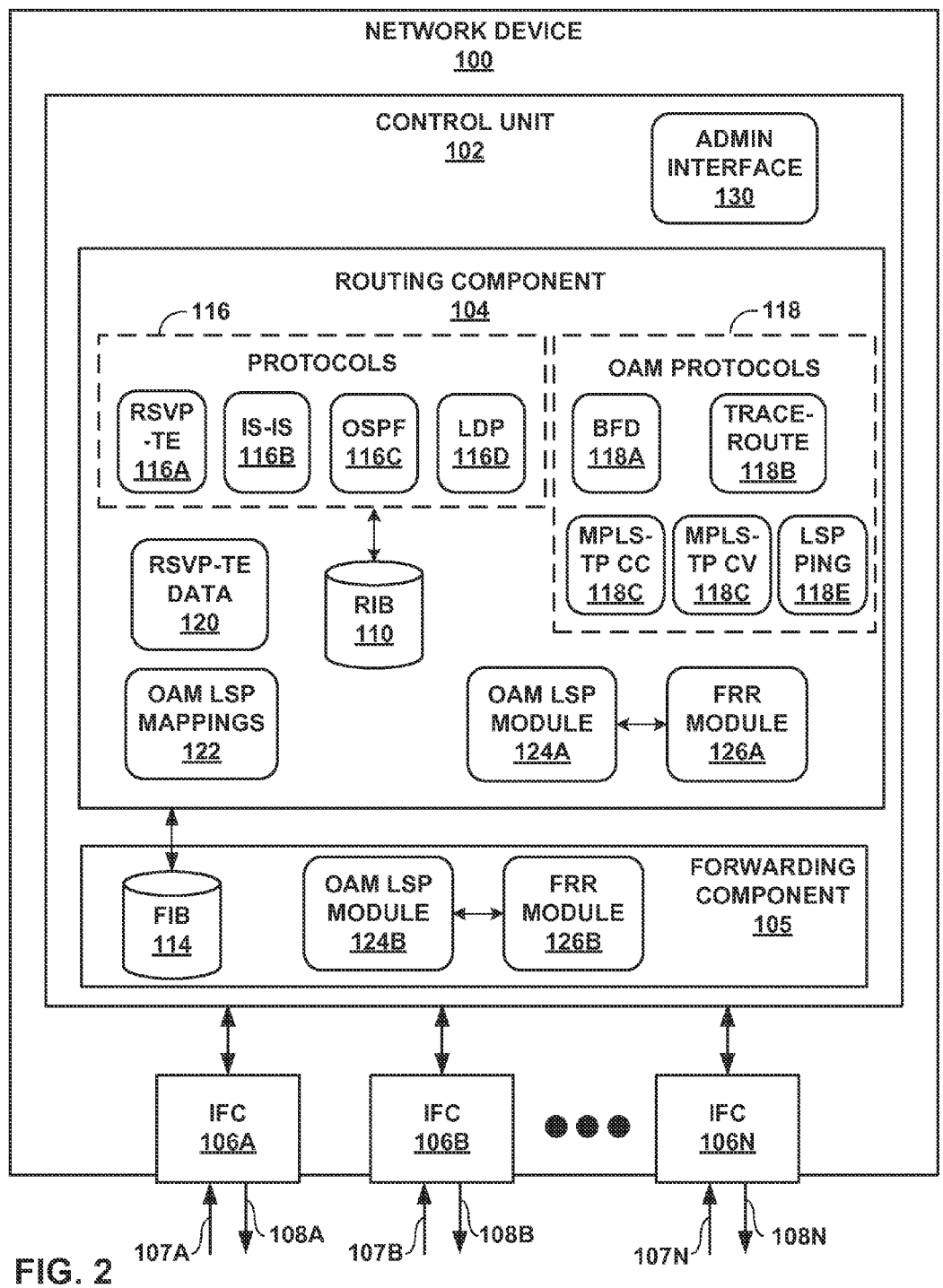
FIG. 2 is a block diagram illustrating an example embodiment of a network device in accordance with the techniques of this disclosure.

FIG. 2 is a block diagram illustrating an example embodiment of a network device in accordance with the techniques of this disclosure. In general, network device 100 may operate in a manner substantially similar to any of the network devices, routers, or nodes illustrated in the previous figure. For example, network device 100 may be a PLR such as network device 12B of FIG. 1. In the example of FIG. 2, network device 100 includes a control unit 102 that includes a routing component 104 coupled to a forwarding component 105. Network device 100 includes interface cards 106A-106N ("IFCs 106") that receive packets via inbound links 108A-107N ("inbound links 107") and send packets via outbound links 108A-108N ("outbound links 108"). IFCs 106 may be coupled to links 107, 108 via a number of interface ports (not shown).

Routing component 104 operates as the control plane for network device 100 and includes an operating system that provides a multi-tasking operating environment for execution of a number of concurrent processes. Routing component 104 provides an operating environment for routing protocols to execute routing processes. Routing component 104 is responsible for the maintenance of a routing information base (RIB) 110 to reflect the current topology of a network and other network entities to which it is connected. In particular, routing component 104 periodically updates RIB 110 to accurately reflect the topology of the network and other entities. RIB 110 may describe a topology of the computer network in which network device 100 resides, and may also include routes through the shared trees in the computer network. RIB 110 describes various routes within the computer network, and the appropriate next-hops for each route, i.e., the neighboring routing devices along each of the routes.

In accordance with RIB 110, forwarding component 105 maintains forwarding information base (FIB) 114 that associates network destinations with specific next-hops and corresponding IFCs 106 and physical output ports for output links 108. For example, routing component 104 analyzes RIB 110 and generates FIB 114 in accordance with RIB 110. Routing component 104 includes high-level, control plane routing protocols 116A-116N ("routing protocols 116"). Routing protocols 116 may be software processes executing on one or more processors, such as hardware-based processors. In the example of FIG. 2, protocols 116 include label distribution protocols RSVP-TE 116A, and Label Distribution Protocol (LDP) 116D, and IS-IS 116B, OSPF 116C, for exchanging routing information with other routing devices and for updating RIB 110. Routing component 104 may include other routing protocols not shown in FIG. 5, such as the Border Gateway Protocol (BGP), for example. Routing protocols 116 interact with kernel 118 to update RIB 110 based on routing protocol messages received by network device 100. In response, route selection module 112 of kernel 118 generates forwarding information based on the network topology represented in RIB 110. Kernel 118 then programs forwarding component 105 to install the forwarding information as FIB 114.

Routing component 104 also includes OAM protocols 118. In the example of FIG. 2, OAM protocols 118 include BFD 118A, traceroute 118B, MPLS-TP continuity check (CC) 118C, MPLS-TP continuity verification (CV) and LSP ping 118E. However, in some examples, network device 100 may include a subset of these OAM protocols 118, or may additionally or alternatively include different OAM protocols not shown. Additionally or alternatively, network device 100 may use other OAM mechanisms or techniques that may not be considered OAM protocols per se, such as MPLS-TP mechanisms of lock instruct and loopback function, other MPLS-TP mechanisms, and other OAM mechanisms.

Forwarding component 105 represents hardware and logic functions that provide high-speed forwarding of network traffic. Forwarding component 105 may include a set of one or more forwarding chips programmed with FIB 114 that maps network destinations and/or MPLS labels with specific next-hops and the corresponding output interface ports. In general, when network device 100 receives a packet via one of inbound links 107, forwarding component 105 identifies an associated next-hop for the data packet by traversing FIB 114 based on information within the packet. Forwarding component 105 forwards the packet on one of outbound links 108 mapped to the corresponding next-hop in accordance with FIB 114. FIB 114 may be a radix tree programmed into dedicated forwarding chips, a series of tables, a complex database, a link list, a radix tree, a database, a flat file, or various other data structures.

In the example of FIG. 2, control unit 102 provides an operating environment for a resource reservation protocol module 116A ("RSVP-TE module 116A") executing within control unit 102. RSVP-TE module 116A receives resource reservation requests from other routing devices, and reserves the requested bandwidth on outbound links 108 for RSVP-TE traffic. Although described for exemplary purposes in reference to RSVP-TE, the principles described herein may be applied to extend other protocols, such as other protocols for label distribution and/or traffic engineering.

RSVP-TE module 116A has been extended as described herein to support the use of dedicated OAM LSPs for use with MPLS fast reroute. RSVP-TE module 116A can receive and send RSVP-TE PATH and RESV messages for establishing LSPs. RSVP-TE module 116A stores data relating to the LSPs in RSVP-TE data 120. Consistent with the principles of this disclosure, RSVP-TE module 116A provides signaling mechanisms for automatically establishing a dedicated OAM LSP upon detecting that a data LSP is being initially established, and automatically associating a data LSP with a previously established dedicated OAM LSP. In certain examples, the operations may be carried out automatically, i.e., without intervention by a system administrator or a software agent.

RSVP-TE module 116A may receive an RSVP-TE RESV message from network device 12C, where the RESV message is for establishing a primary data LSP 20 along a primary path. The RESV message may indicate that link and/or node protection are desired for the LSP. In accordance with the techniques of this disclosure, RSVP-TE module 116A extracts an RRO from the RESV message and uses the RRO message to identify a primary path to a merge point network device. For example, RSVP-TE module 116A may do a route lookup of the address of an interface port specified in the RRO, to determine an interface port on which to output a PATH message on the primary path to the next LSR on the path specified in the RRO, for establishing a dedicated OAM LSP 22. RSVP-TE module 116A may do the lookup in RIB 110, or FIB 114, for example. Based on the route lookup, network device 100 can identify an interface port of network device 100 on which to output the PATH message. RSVP-TE module 116A generates the PATH message to include an ERO that specifies the primary path to the merge point, based on the RRO of the received RESV message. In the example of FIG. 1, where the RRO of the received RESV message indicated a path of [12E, 12D, 12C, 12B, 12A], RSVP-TE module 116A may generate the PATH message for establishing the dedicated OAM LSP to include an ERO of [12B, 12C, 12D] to the merge point network device 12D. OAM LSP module 124A can also update OAM LSP mappings 122 to associate the OAM LSP 22 with the primary LSP 20. Although shown in the control plane of network device 100 (e.g., in routing component 104), the OAM LSP mappings 122 may in some examples be installed in the forwarding plane (forwarding component 105).

Also in response to receiving the RESV message from network device 12C, RSVP-TE module 116A may send a PATH message along an alternate path to establish a protecting LSP 17 that avoids a protected resource, to which network device 100 can reroute data traffic from protected LSP 20 if the protected resource fails. Also in response to receiving the RESV message from network device 12C, RSVP-TE module 116A stores data from the RESV message for LSP 20 in RSVP-TE data 120. For example, RSVP-TE module 116A stores a MPLS label, provided by network device 12C in the RESV message, to be used for sending traffic on LSP 20. RSVP-TE module 116A may also store MPLS fast reroute objects from the RESV message.

RSVP-TE module 116A may generate a RESV message that routing device 100 sends to the ingress network device 12A. RSVP-TE module 116A allocates an MPLS label for LSP 20, and includes the MPLS label in the RESV message. RSVP-TE module 116A may insert into a Route Record Object (RRO) of the RESV message an IPv4 or IPv6 subobject having the "Local protection in use" and "Local Protection Available" flags set.

In this manner, network device 100 uses its MPLS fast reroute capabilities and the extensions to RSVP-TE described herein to set up its control plane and data plane state to establish a dedicated OAM LSP to monitor the primary path associated with the new LSP 20 at the time of initial establishment of LSP 20.

In the example of FIG. 2, portions of OAM LSP module 124A and OAM LSP module 124B are shown in the control plane of network device 100 (e.g., in routing component 104), and the forwarding plane (forwarding component 105), respectively. This is to indicate that certain functionality of the OAM LSP modules 124A-124B may be present in the control plane, and some may be present in the forwarding plane (e.g., in hardware). In other examples, a single OAM LSP module may reside only in the control plane or only in the forwarding plane. Similarly, portions of FRR module 126A and FRR module 126B are shown in the control plane of network device 100 (e.g., in routing component 104), and the forwarding plane (forwarding component 105), respectively. This is to indicate that certain functionality of the FRR modules 126A-126B may be present in the control plane, and some may be present in the forwarding plane (e.g., in hardware). In other examples, a single OAM LSP module may reside only in the control plane or only in the forwarding plane.

OAM module 124B may monitor activity of one or more OAM protocols 118 executing on the established OAM LSP 22, such as by receiving OAM packets in the forwarding plane and determining when expected OAM packets are not received. Based on this monitoring, OAM module 124B may detect when liveliness of OAM LSP 22 has failed. OAM module 124B can notify FRR module 126B of the failure of OAM LSP 22, upon which FRR module 126B can work with forwarding component 105 to reroute any primary data LSPs supported by OAM LSP 22 to be forwarded to next hops on protecting LSP 17 instead.

In some examples, administrator interface (ADMIN INTERFACE) 130 may receive configuration information from an administrator that routing device 30 is to be an ingress LSR of an OAM LSP 22 to be established, and configuration information of what protected data LSPs are to be associated with the OAM LSP 22. In this way, an administrator may statically configure OAM LSP 22 via admin interface 130.

Figure 3:
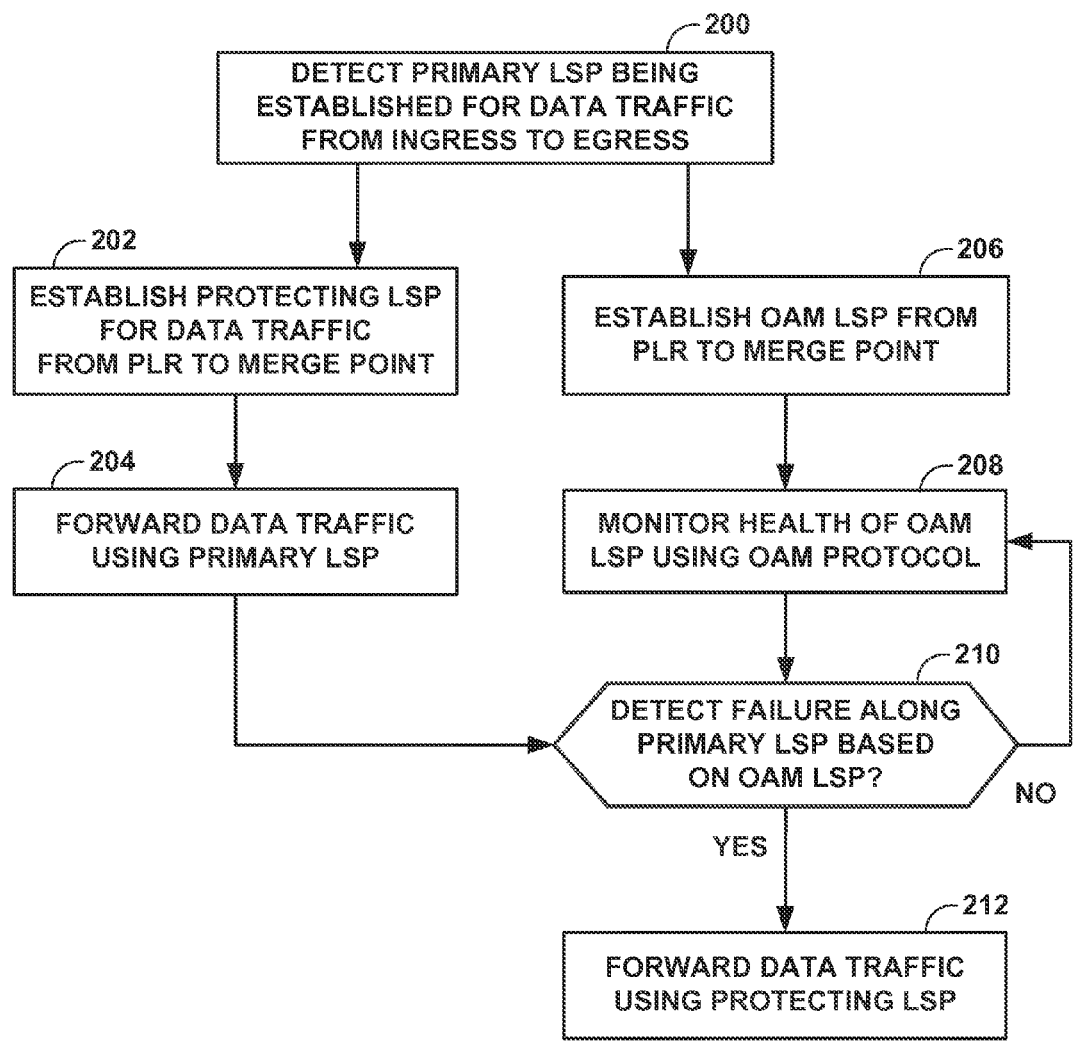
FIGS. 3-4 are flowcharts illustrating example operation of network devices in accordance with the techniques of this disclosure.

FIG. 3 is a flowchart illustrating example operation of network devices in accordance with the techniques of this disclosure. For purposes of example, FIG. 3 will be described with reference to PLR network device 12B of FIG. 1, and routing device 100 of FIG. 2. Although FIG. 3 is described for purposes for illustration with respect to a PLR router that is not also the ingress of the primary data LSP 20, the techniques may be also applied to a PLR that is the ingress of the data LSP 20.

In the example of FIG. 3, network device 12B detects that a primary LSP 20 is being established for transmitting data traffic from ingress network device 12A to egress network device 12E (200). For example, network device 12B may receive an RSVP-TE RESV message from network device 12C, where the RSVP-TE RESV message is for reserving bandwidth along a primary path for LSP 20. In response to receiving the RESV message, network device 12B establishes a protecting LSP 17 (202) that extends along a secondary path (12B, 12F, 12D) to the merge point network device 12D, which avoids one or more protected resources along the primary path, such as network device 12C, or one of network links 15B, 15C. Network device 12B uses protecting LSP 17 for providing MPLS fast reroute protection to one or more protected LSPs, including LSP 20. In some examples, network device 12B may already have a protecting LSP previously established, and so network device 12B may simply associate the existing protecting LSP with the new primary data LSP 20. When no problems are detected with the primary LSP 20, network device 12B forwards data traffic to network device 12E using the primary LSP 20 (204).

Also in response to receiving the RESV message, RSVP-TE module 116A may be configured to automatically establish a dedicated OAM LSP 22 from network device 12B to the merge point network device 12D (206). In some examples, rather than automatically establishing the OAM LSP 22, an administrator may configure network device 12B to statically configure network device 12B to establish OAM LSP 22. OAM LSP 22 carries no data traffic, but is dedicated to carrying OAM messages to verify connectivity of a subset of the primary path from the ingress network device 12A to the egress network device 12E. In this example, the subset of the primary path from the ingress to the egress is the path from network device 12B to network device 12C to network device 12D. OAM LSP module 124A stores a mapping of the OAM LSP 22 to the primary data LSP 20 to OAM LSP mappings 122, to associate the OAM LSP 22 with primary data LSP 20. OAM LSP module 124B in the forwarding plane, using one or more of OAM protocols 118, monitors a health of OAM LSP 22 (208) by sending and receiving OAM packets in the forwarding plane (represented by forwarding component 105) of network device 100. This provides OAM LSP module 124B an indication of the connectivity of resources along the subset of the primary path of LSP 20. The OAM protocol may be, for example, LSP ping, traceroute. MPLS-TP CC, MPLS-TP CV, BFD for MPLS, or another OAM protocol or OAM mechanism. For example, one or more of OAM protocols 118 may be used by OAM LSP modules 124A and/or 124B to send and receive one or more of LSP ping packets, traceroute packets, BFD messages, or MPLS-TP CC or CV messages, including MPLS-TP fault management messages or other MPLS-TP messages.

If OAM LSP module 124B detects, using the OAM protocol 118 running over OAM LSP 22, that there has been a failure of some resource along OAM LSP 22 (210), then OAM LSP module 124B can inform FRR module 126B in the forwarding plane of the failure of one or more protected LSPs associated with OAM LSP 22. As one example, OAM LSP module 124A or 124B may access OAM LSP mappings 122 to determine which protected LSPs are associated with OAM LSP 22, and may inform FRR module 126B of the associated protected LSPs that have a failure associated with the dedicated OAM LSP 22. FRR module 126B can then automatically update FIB 114 and/or forwarding ASICs of forwarding component 105 of network device 12B to quickly reroute the data traffic received at network device 12B from primary LSP 20 to protecting LSP 17 (212), and can similarly reroute traffic from any other protected LSPs associated with OAM LSP 22 to their respective protecting LSP(s), which may or may not be protecting LSP 17.

Figure 4:
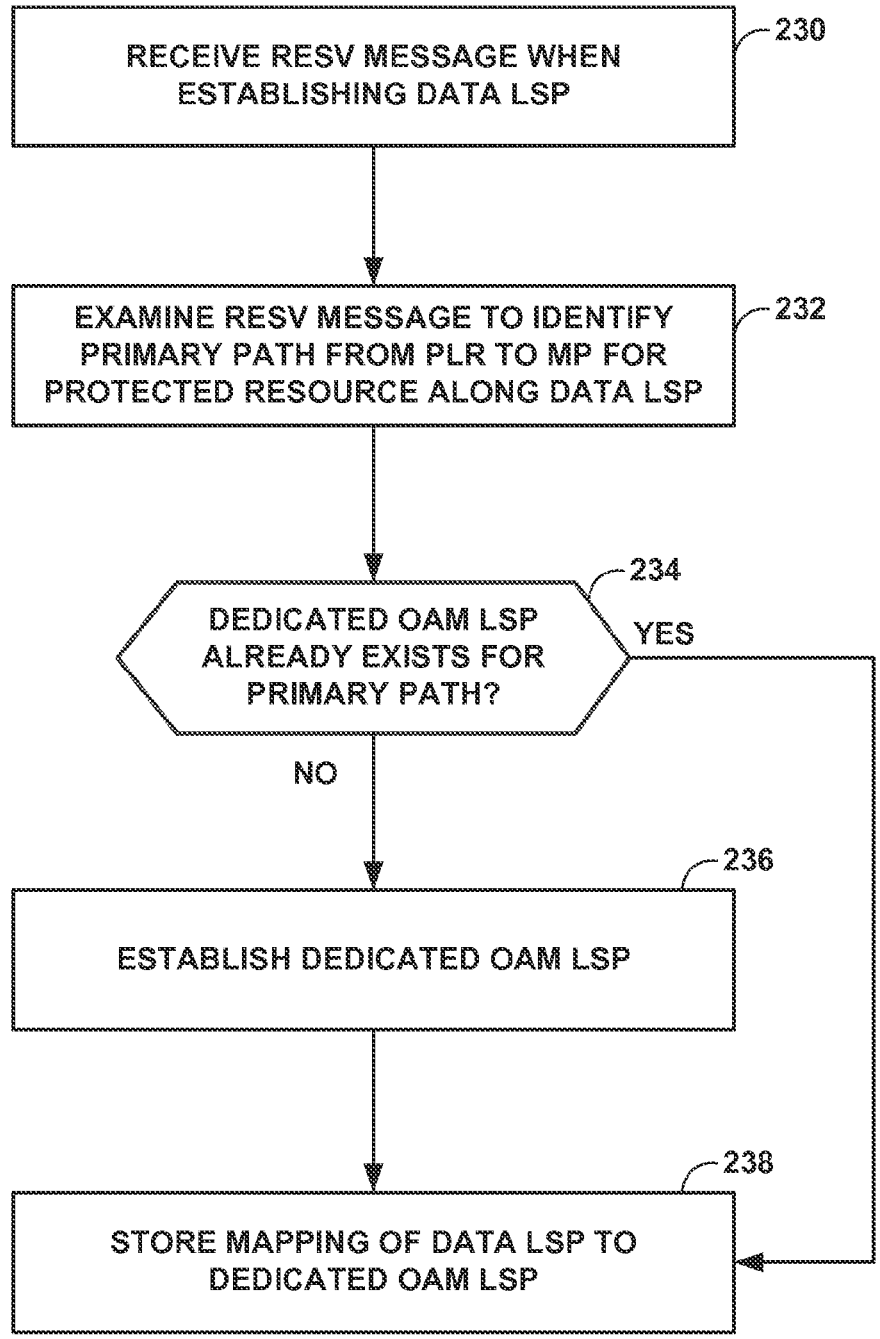

FIG. 4 is a flowchart illustrating example operation of network devices in accordance with the techniques of this disclosure. FIG. 4 shows an example process for establishing the OAM LSP in further detail. Network device 12B can receive a RESV message when a data LSP is being established from network device 12A to network device 12E (230). Network device 12B can examine characteristics of the RESV message to identify a primary path from network device 12B to the MP network device 12D for a protected resource along the data LSP (232). For example, network device 12B can examine a Record Route Object (RRO) contained within an RSVP-TE RESV message received during setup of each data LSP that network device 12B is protecting. The RESV message may also indicate that fast reroute link protection and/or node protection are desired for the LSP. Based on the RRO of the received RESV message, network device 12B can identify the primary path from network device 12B to MP network device 12D, and, if no OAM LSP already exists for that primary path (YES branch of 234), establish a new OAM LSP 22 along a subset of the primary path that will monitor the primary path (236).

Network device 12B can maintain a mapping of protected data LSPs to the OAM LSP (238). For example, OAM LSP module 124A may store in OAM LSP mappings 122 a mapping of the OAM LSP 22 to the primary data LSP 20 to OAM LSP mappings 122. If PLR network device 12B determines that an OAM LSP already exists for that primary path (YES branch of 234), the PLR network device 12B can add the data path to the stored mapping of data paths to the OAM LSP (238). As described above, when the OAM LSP module 124B reports that the liveliness is down along the primary path between the PLR network device 12B and MP network device 12D due to a link or node failure detected using an OAM protocol along the primary path, FRR module 126B in the data plane of the PLR network device 12B can quickly and automatically reroute all of the data LSPs linked to the OAM LSP 22 to the appropriate backup protecting LSP(s). In this manner, network device 12B can reroute data traffic onto a protecting LSP in less than 50 milliseconds from the time of failure. The techniques allow network device 12B to monitor and detect liveliness of an active path between network device 12B and the MP, rather than monitoring only the operational status of the MP. The techniques describe herein can therefore result in detection of failures in scenarios in which failure would not otherwise be noticed by the PLR network device 12B.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

The invention claimed is:

1. A method comprising:
   in response to receiving, by a first network device, a reply message for reserving bandwidth along a primary path for a first label switched path (LSP) for carrying data traffic from an ingress network device to an egress network device, wherein the reply message comprises a Resource Reservation Protocol with Traffic Engineering extensions (RSVP-TE) RESV message that specifies a Multiprotocol Label Switching (MPLS) label to use for sending network traffic along the first LSP, wherein the RSVP-TE RESV message includes a Record Route Object (RRO) that specifies hops along the primary path for the first LSP:
       generating an RSVP-TE PATH message for establishing a second LSP from the first network device to a second network device along a subset of the primary path, wherein the RSVP-TE PATH message specifies an Explicit Route Object (ERO) generated by the network device based on the RRO included in the received RSVP-TE RESV message; and
       outputting the RSVP-TE PATH message to establish the second LSP from the first network device to the second network device;
   wherein the first network device comprises a point of local repair along the primary path and the second network device comprises a merge point for merging rerouted data traffic from a protecting LSP back onto the first LSP along the primary path, wherein the second LSP is dedicated to carrying operations, administration and management (OAM) messages to verify connectivity of the subset of the primary path;
   forwarding data traffic received at the first network device to a next hop along the primary path, wherein the forwarded data traffic is encapsulated with a first label associated with the first LSP; and
   outputting, by the first network device, an OAM message to a next hop along the second LSP to verify connectivity of at least one protected resource along the subset of the primary path, wherein the OAM message is encapsulated with a second label associated with the second LSP.

2. The method of claim 1,
   wherein establishing the second LSP comprises by the first network device, automatically establishing the second LSP in response to receiving the reply message.

3. The method of claim 1, wherein establishing the second LSP comprises:
receiving static configuration information at the first network device for establishing the second LSP; and
by the first network device, establishing the second LSP in response to receiving the static configuration information.

4. The method of claim 1, further comprising:
receiving a reply OAM message on the second LSP in response to the OAM message, wherein the reply OAM message confirms connectivity of the protected resource along the primary path.

5. The method of claim 1, further comprising:
with the first network device, in response to receiving the reply message, establishing the protecting LSP from the first network device to the second network device, wherein the protecting LSP extends along a secondary path that avoids the protected resource along the primary path, wherein the protecting LSP is used by the first network device for providing Multiprotocol Label Switching (MPLS) fast reroute protection to the first LSP.

6. The method of claim 5, further comprising:
with an OAM mechanism, determining that connectivity of the protected resource along the primary path for the first LSP is not operational based on a failure to receive a reply to the OAM message; and
in response to the determination, with the network device, automatically updating a forwarding plane of the first network device to forward the data traffic to a next hop along the protecting LSP instead of forwarding the data traffic along the primary path on the first LSP.

7. The method of claim 1, wherein the OAM message comprises an LSP ping message.

8. The method of claim 1, wherein the OAM message comprises a message for route tracing in Multiprotocol Label Switching Transport Profile (MPLS-TP).

9. The method of claim 1, wherein the OAM message comprises a Bidirectional Forwarding Detection (BFD) for Multiprotocol Label Switching (MPLS) message.

10. The method of claim 1, wherein the OAM message comprises a message for one of connectivity verification and continuity check in Multiprotocol Label Switching Transport Profile (MPLS-TP).

11. The method of claim 1, further comprising:
in response to receiving the reply message, prior to establishing the second LSP, automatically determining whether the second LSP exists dedicated to carrying OAM messages to verify connectivity of the subset of the primary path;
upon determining that no second LSP exists dedicated to carrying OAM messages to verify connectivity of the primary path, automatically establishing the second LSP.

12. The method of claim 1, further comprising:
with the first network device, associating the second LSP with a plurality of primary LSPs having the first network device as a common point of local repair and the second network device as a common merge point; and
with the first network device, rerouting data traffic from each of the plurality of primary LSPs to respective protecting LSPs upon detecting, based on the OAM message, that connectivity of the protected resource along the second LSP is down.

13. The method of claim 1, further comprising:
in response to receiving a second reply message for reserving bandwidth along a second primary path for a third LSP for carrying data traffic from a second ingress network device to a second egress network device, determining that the second LSP dedicated to carrying OAM messages to verify connectivity of subset of the primary path is established,
wherein the protected resource along the primary path comprises a protected resource along the second primary path for the third LSP, and wherein the first network device comprises a point of local repair along the second primary path and the second network device comprises a merge point for the second LSP along the primary path,
associating the second LSP with the third LSP to allow the first network device to reroute data traffic from the third LSP to a protecting LSP when first network device detects based on the second LSP that connectivity of the protected resource along the second primary path is down.

14. The method of claim 1, wherein the protected resource comprises one of a protected network device along the primary path and a protected network link along the primary path.

15. A network device comprising:
a hardware-based processor;
a Resource Reservation Protocol with Traffic Engineering extensions (RSVP-TE) module executing on the hardware-based processor, wherein the RSVP-TE module is configured to, in response to receiving a reply message with a first network device for reserving bandwidth along a primary path for a first label switched path (LSP) for carrying data traffic from an ingress network device to an egress network device, wherein the reply message comprises an RSVP-TE RESV message that specifies a Multiprotocol Label Switching (MPLS) label to use for sending network traffic along the first LSP, wherein the RSVP-TE RESV message includes a Record Route Object (RRO) that specifies hops along the primary path for the first LSP:
generate an RSVP-TE PATH message for establishing a second LSP from the first network device to a second network device along a subset of the primary path, wherein the RSVP-TE PATH message specifies an Explicit Route Object (ERO) generated by the network device based on the RRO included in the received RSVP-TE RESV message; and
output the RSVP-TE PATH message to establish the second LSP from the first network device to the second network device,
wherein the first network device comprises a point of local repair along the primary path and the second network device comprises a merge point for merging rerouted data traffic from a protecting LSP back onto the first LSP along the primary path, wherein the second LSP is dedicated to carrying operations, administration and management (OAM) messages to verify connectivity of the subset of the primary path; and
a forwarding component configured to forward data traffic received at the first network device to a next hop along the primary path, wherein the forwarded data traffic is encapsulated with a first label associated with the first LSP,
an OAM module configured to generate an OAM message, wherein the forwarding component is configured to output the OAM message to a next hop along the second LSP to verify connectivity of at least one protected resource along the subset of the primary path, wherein the forwarding component encapsulates the OAM message with a second label associated with the second LSP.

16. The network device of claim 15, wherein the RSVP-TE module is configured to, in response to receiving the reply message, establish a protecting LSP from the first network device to the second network device, wherein the protecting LSP extends along a secondary path that avoids the protected resource along the primary path, wherein the protecting LSP is used by the first network device for providing Multiprotocol Label Switching (MPLS) fast reroute protection to the first LSP.

17. The network device of claim 16, further comprising:
a fast reroute module,
wherein the OAM module is configured to determine that connectivity of the protected resource along the first path the first LSP is not operational based on a failure to receive a reply to the OAM message, and in response to the determination inform the fast reroute module that the first LSP is not operational,
wherein the fast reroute module is configured to automatically update a forwarding plane of the first network device to forward the data traffic to a next hop along the protecting LSP instead of forwarding the data traffic along the primary path on the first LSP.

18. The network device of claim 15, wherein the OAM message comprises one of an LSP ping message, traceroute, a Bidirectional Forwarding Detection (BFD) for Multiprotocol Label Switching (MPLS) message, a message for route tracing in Multiprotocol Label Switching Transport Profile (MPLS-TP), a message for connectivity verification in MPLS-TP, and a message for continuity check in MPLS-TP.

19. The network device of claim 15, wherein the RSVP-TE module is configured to automatically establish the second LSP in response to receiving the reply message.

20. The network device of claim 15, wherein the RSVP-TE module is configured to receive static configuration information at the first network device for establishing the second LSP, and establish the second LSP in response to receiving the static configuration information.

21. A non-transitory computer-readable storage medium comprising instructions for causing a programmable processor of a first network device to:

in response to receiving, by the first network device, a reply message for reserving bandwidth along a primary path for a first label switched path (LSP) for carrying data traffic from an ingress network device to an egress network device, wherein the reply message comprises a Resource Reservation Protocol with Traffic Engineering extensions (RSVP-TE) RESV message that specifies a Multiprotocol Label Switching (MPLS) label to use for sending network traffic along the first LSP, wherein the RSVP-TE RESV message includes a Record Route Object (RRO) that specifies hops along the primary path for the first LSP:
generate an RSVP-TE PATH message for establishing a second LSP from the first network device to a second network device along a subset of the primary path, wherein the RSVP-TE PATH message specifies an Explicit Route Object (ERO) generated by the network device based on the RRO included in the received RSVP-TE RESV message; and
output the RSVP-TE PATH message to establish the second LSP from the first network device to the second network device,
wherein the first network device comprises a point of local repair along the primary path and the second network device comprises a merge point for merging rerouted data traffic from a protecting LSP back onto the first LSP along the primary path, wherein the second LSP is dedicated to carrying operations, administration and management (OAM) messages to verify connectivity of the subset of the primary path;
forward data traffic received at the first network device to a next hop along the primary path, wherein the forwarded data traffic is encapsulated with a first label associated with the first LSP; and
output an OAM message to a next hop along the second LSP to verify connectivity of at least one protected resource along the subset of the primary path, wherein the OAM message is encapsulated by a second label associated with the second LSP.

* * * * *